United States Patent
Lettkeman et al.

(10) Patent No.: US 7,374,611 B2
(45) Date of Patent: May 20, 2008

(54) SPRAYABLE MACHINABLE MEDIA

(75) Inventors: Dennis Mark Lettkeman, Watonga, OK (US); Raymond A. Kaligian, II, Geneva, IL (US); Eldon L. Whiteside, Hinsdale, IL (US); Salvatore C. Immordino, Jr., Trevor, WI (US)

(73) Assignee: United States Gypsum Company, Chicago, IL (US)

( * ) Notice: Subject to any disclaimer, the term of this patent is extended or adjusted under 35 U.S.C. 154(b) by 126 days.

(21) Appl. No.: 10/511,498

(22) PCT Filed: Mar. 27, 2003

(86) PCT No.: PCT/US03/09569

§ 371 (c)(1),
(2), (4) Date: Oct. 15, 2004

(87) PCT Pub. No.: WO03/082767

PCT Pub. Date: Oct. 9, 2003

(65) Prior Publication Data

US 2005/0235882 A1    Oct. 27, 2005

(51) Int. Cl.
C04B 28/14    (2006.01)
C04B 24/26    (2006.01)
C04B 24/38    (2006.01)

(52) U.S. Cl. ............ 106/779; 106/778; 106/780; 106/783; 264/333; 427/355; 427/403; 427/427

(58) Field of Classification Search ............ 106/778, 106/779, 780, 783; 264/333; 427/355, 403, 427/427
See application file for complete search history.

(56) References Cited

U.S. PATENT DOCUMENTS

| 3,301,848 | A | 1/1967 | Halleck |
| 5,175,278 | A | 12/1992 | Vanier et al. |
| 5,306,340 | A | 4/1994 | Donche et al. |
| 5,653,797 | A * | 8/1997 | Patel .................... 106/781 |
| 6,068,697 | A | 5/2000 | Yamamuro et al. |
| 6,241,815 | B1 | 6/2001 | Bonen |
| 6,355,099 | B1 | 3/2002 | Immordino et al. |
| 6,406,537 | B1 * | 6/2002 | Immordino .......... 106/778 |
| 6,673,144 | B2 * | 1/2004 | Immordino et al. ...... 106/778 |

OTHER PUBLICATIONS

Kelco Biopolymers. *Material Safety Data*. Jun. 6, 2000.
CP Kelco. *K1C376, welan gum*. Sep. 12, 2000.
CP Kelco. *K1A96, welan gum*. Sep. 12, 2000.
CP Kelco. *KELTROL® F, xanthan gum*. Sep. 12, 2000.
SKW Chemicals. *Drilling Fluid Polymers*, Feb. 20, 2002.
EDTI's BIO-VIS 2000. Material Safety Data Sheet. http://www.edtidrilling.com/MSDSvis.html, no date.
Product Data, Messina, Inc. *Biovis Xanthan Gum Viscosifier*, no date.

* cited by examiner

*Primary Examiner*—Anthony J. Green
(74) *Attorney, Agent, or Firm*—Greer, Burns & Crain, Ltd.; David F. Janci; Michael M. Geoffrey

(57) ABSTRACT

In conjunction with water, a mixture can be used to prepare a sprayable slurry that hydrates to form a machinable plaster composition. The mixture includes from about 80% to about 98% by weight calcium sulfate hemihydrate, from about 1% to about 5% by weight adhesive binder for adhering said plaster mixture to a substrate and from about 0.001% to about 10% of a polysaccharide. The mixture is made into a slurry by the addition of from 10% to about 50 weight water based on the weight of the mixture.

25 Claims, No Drawings

SPRAYABLE MACHINABLE MEDIA

CROSS REFERENCE TO RELATED APPLICATIONS

This application claims the benefit of U.S. Provisional Application 60/367,920, filed Mar. 27, 2002.

BACKGROUND

This application relates to a sprayable machinable media with good stability. More specifically, it relates to a sprayable gypsum with good machining and spraying properties.

The present invention relates to a plaster mixture for forming a sprayable, machinable composition, and specifically to a plaster mixture that can be adapted to be poured into a mold, trowel applied, or spray applied to a substrate, and machined to a desired shape to produce a dimensionally accurate model.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, which is a byproduct of flue gas desulfurization processes from power plants, may also be used. When it is mined, raw gypsum is found in the dihydrate form. In this form, there are approximately two water molecules of water associated with each molecule of calcium sulfate. In order to produce the hemihydrate form, the gypsum can be calcined to drive off some of the water of hydration by the following equation:

Calcium sulfate hemihydrate can produce at least two crystal forms. Alpha-calcined gypsum is made by a continuous process or a lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology allows water to flow easily between the crystals, requiring less water to form a flowable slurry. More elongated crystals are characteristic of the beta-calcined gypsum. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-calcined gypsum.

A number of useful gypsum products can be made by mixing the calcium sulfate hemihydrate with water and shaping the resulting product slurry into the desired shape. The product slurry is permitted to set by allowing the calcium sulfate hemihydrate to react with sufficient water to convert the hemihydrate into a matrix of interlocking dihydrate crystals. As the matrix forms, the product slurry becomes firm and holds the desired shape. Excess water must then be removed from the product by drying.

When no additives are used, the amount of water added to a calcined gypsum slurry determines the density of the set gypsum matrix. As more water is used, the slurry increases in volume. The theoretical water demand of pure calcium sulfate hemihydrate is 18.6 wt %. The hydrated calcium sulfate matrix forms filling the volume originally occupied by the slurry, trapping the excess water in the crystal interstices of the gypsum matrix. For equal amounts of gypsum, the interstices are larger and more numerous to take up the excess water as the proportion of water is increased. As the size and number of the spaces increases, both the density and the strength of the matrix decreases compared to a composition with little of no excess water. However, slurries with little excess water are very difficult to mix, particularly if beta-calcined gypsum is used.

The amount of water used determines the plasticity of the slurry. Plasticity is the property of plaster which permits permanent and continuous deformation in any direction. As opposed to low viscosity materials, plastic materials require a measurable force to initiate flow. A material of low plasticity is usually described as being "poor" or hard working; high plasticity is described in terms of "rich" or easy working.

In some types of manufacturing, the molds used in production are cast from models. One method of making a model involves shaping a substrate with CNC or other high performance milling machine. In applications where the models are large, such as in the automobile, watercraft and aerospace industries, a large volume of substrate material is necessary to build a model. Therefore, it is desirable that the substrate material be lightweight and economical. Also, the material must be machinable to a high degree of dimensional accuracy. Accordingly, the material must be able to hold a sharp corner and a smooth contour and be dimensionally stable from room temperature through 250° F. (121° C.).

To produce large models, it is common to first fabricate a substrate that is sized slightly less than the full size model. Inexpensive materials such as tooling boards, Styrofoam and the like are commonly used to fabricate the substrate. The substrate is coated with successive layers of a machinable material until the substrate is larger than the model. Finally, the coated substrate is machined into the desired shape.

Plaster mixtures for forming machinable compositions are known. Notably, U.S. Pat. No. 5,534,059 to Immordino describes a high density gypsum composition for use as a machinable composition, which is readily carvable, is able to hold sharp corners and smooth contours, and is dimensionally stable from room temperature to 250° F. (121° C.). This plaster contains a polymer binder for increasing strength of the plaster and for preventing the generation of dust during machining. As disclosed in the Immordino patent, the binder is an ethylene/vinyl acetate/vinyl chloride terpolymer. Up to 10 to 20 percent by weight of polymer binder is preferably added to the plaster to obtain the desired consistency. The composition of Immordino discloses the addition of an internal lubricating agent to minimize friction during machining. Further, this composition may not be spray applied to a substrate since, if sprayed, due to the effects of gravity, the composition will flow prior to set and before building up a machinable thickness.

U.S. Pat. No. 6,355,099 to Kaligian et al discloses a sprayable, machinable plaster utilizing an internal binder, an external binder and a system of accelerators and retarders. Although a proper set time is obtainable, the accelerator system is complex and is sensitive to temperature and other conditions.

Machinable materials adapted to be spray applied on a substrate are also known, namely, polyester and polyurethane foams. Polyester is undesirable because it is possible to apply only about a 1/16 inch (1.6 mm) coat at a time. Therefore, numerous coats of polyester are needed to build up an appreciable thickness. Also, because each coat must be allowed to dry before the next coat, this method is time consuming.

Polyurethane foams are undesirable because they do not produce a coat with a uniform thickness and the coats normally have numerous air pockets. Therefore, to achieve dimensional accuracy, significant surface preparation is necessary following machining. Polyester and polyurethane foams generate static electricity and undesirable amounts of dust during machining. The combination of the static and the dust creates an unwanted mess. Further, the isocyanate used for curing the polyurethanes is a known carcinogen.

Thus, there is a need in the art for a means to stabilize the set time of a slurry and to allow the sprayed composition to build up quickly to a machinable thickness. There is a further need to increase the concentration of beta-calcined gypsum relative to alpha-calcined gypsum at approximately a constant water demand. When these needs are met, products made of sprayable, machinable plasters can be made more quickly, with less waste and/or at lower cost.

BRIEF DESCRPITION OF THE INVENTION

Accordingly, it has been discovered that the use of polysaccharides in sprayable, machinable plaster compositions enables use of a simplified accelerator system that is more stable over a range of time, temperature and shear force.

In conjunction with water, a mixture can be used to prepare a sprayable slurry that hydrates to form a machinable plaster composition. The mixture includes from about 80% to about 98% by weight calcium sulfate hemihydrate, from about 1% to about 5% by weight adhesive binder for adhering said plaster mixture to a substrate and from about 1% to about 20% of a polysaccharide. The mixture is made into a slurry by the addition of from 10% to about 50 weight % water based on the weight of the mixture.

Surprisingly, in this formulation, the polysaccharide acts not only as a thickener, but also allows a decrease in of the number of accelerators and retarders. The simpler accelerator system is more controllable and more stable over a larger range of variables. The resulting sprayable plaster retains a desired plasticity for a longer time during spraying. The slurry (or plaster) is stable to higher temperatures. Consistent spraying is also possible over a wider range of shear forces that are applied to the slurry as it is forced through a spray gun for application.

It has also been discovered that, by increasing the concentration of the polysaccharide to amounts up to 20%, the polysaccharide also takes the place of the internal binder. The sprayable plaster holds together and clings to itself when sprayed onto a surface without stickiness. When dry, the plaster has good machinability and lubricity. During the machining process, the plaster holds together and is cut from the model in uniform shavings. This minimizes the amount of fine plaster dust generated, resulting in a cleaner workplace and less time needed to clean up. Advantageously, these benefits are obtained without a waxy accumulation at the surface as sometimes occurs with the addition of polyethylene glycol.

The improved sprayable product also allows a more efficient work schedule because the product dries faster. Product can be sprayed at a faster rate with less sagging and dripping. When the desired thickness has accumulated, it is ready to be machined in as little as 30 minutes.

DETAILED DESCRIPTION OF THE INVENTION

This invention is directed to a dry mixture that is added to water to form a slurry that is sprayable, and when set, can easily be machined to a desired shape. Such a mixture is useful when making plaster models or other articles that require cutting and shaping of the set plaster. The dry mixture includes calcium sulfate hemihydrate, an external binder and a polysaccharide. An internal binder replaces a portion of the polysaccharide in some embodiments of the invention.

The primary component of the dry mixture is calcium sulfate hemihydrate. The dry mixture composition preferably includes from about 80% to about 98% hemihydrate by weight. More preferably, from about 80% to about 95% or from 88% to about 95% of the dry mixture is calcium sulfate hemihydrate.

Either alpha calcium sulfate hemihydrate ($\alpha$-CaSO$_4$·½H$_2$O) or beta calcium sulfate hemihydrate ($\beta$-CaSO$_4$·½H$_2$O) can be used in the mixture. The alpha version of calcium sulfate hemihydrate crystals is less acicular in shape than the beta version. The less acicular shape allows the crystals to wet out and flow much better when mixed with water. The lower water demand of the alpha form results in a more closely packed, and higher density composite in comparison to the resultant interlocking matrix of calcium sulfate hemihydrate crystals utilizing the beta form of calcium sulfate hemihydrate. As is known in the art, the combination of alpha and/or beta calcium sulfate hemihydrate controls the amount of water needed to form a workable slurry, which controls the density of the final cast model.

Whether alpha or beta-calcined gypsum, or a combination of both, is selected for a particular application depends on a number of factors. Preferably, beta-calcined gypsum is used to a large extent where cost is a primary concern. Beta-calcined gypsum is also preferable where hand carving of the model is expected, as the beta form is easier to cut by hand. However, in some embodiments, where water addition is minimized for strength, the alpha form is preferred. Selection of alpha-calcined gypsum, beta-calcined gypsum or mixtures of the two for a particular application is within the ordinary skill of an artisan in this field.

The dry mixture of the present composition also includes an adhesive binder for increasing the adhesive bond strength at the substrate/machinable thickness interface. Preferably, the adhesive binder is a redispersible polymer powder having adhesive properties. The adhesive binder should be hydrophobic to prevent migration with water to the air-exposed non-substrate-contacting surface of the machinable thickness. It is not crucial that the adhesive binder have a glass transition temperature, $T_g$, greater than room temperature, as the adhesive binder concentration in the dry mixture is low. Further, adhesive polymers having these physical properties can be added in either emulsion or redispersible powder form.

Preferably, the adhesive binder is a poly(vinyl acetate)-based polymer that is spray dried and coated with poly(vinyl alcohol) (also known as a protective colloid). The coating improves the water redispersion of the adhesive binder. In one embodiment, the dry mixture includes from about 0.1% up to 5%, preferably 2%, by weight ethylene/vinyl acetate copolymer. Ethylene/vinyl acetate copolymer is available under the trade name VINNAPAS RP226 from Wacker Polymer Systems, LP of Adrian, Mich. or Elotex 50E200 (National Starch and Chemical, Bridgewater, N.J.).

A pure vinyl acetate homopolymer may be used in place of the ethylene/vinyl acetate copolymer. Most commercially available vinyl acetate homopolymers that are sold in powder form are water redispersible, as the individual powder granules are coated with a hydrophilic material. Any of these polymer classes may exist in either the powdered or in the emulsion form and may be introduced to the system either as a dry mix or in the slurry water.

Polyvinyl alcohol may be used as the adhesive binder. However, because poly(vinyl alcohol) is very water soluble, it tends to migrate to the surface of the machinable thickness during set. As a result, a concentration gradient of poly(vinyl alcohol) localizes at the non-substrate contacting surface which inhibits moisture loss as well as has a tendency to entrain air during mixing which results in imperfections in the crystalline structure. Set time is also increased due to poly(vinyl alcohol)'s retarding nature, and dimensional stability is reduced due to the entrained air. Another potential alternative adhesive binder may be selected from the acrylic binders known in the art, but, like the poly(vinyl alcohols), they also tend to entrain air and retard set and are therefor somewhat less desirable.

High molecular weight polysaccharides are another component of the dry mixture. The polysaccharide acts as a dispersant to keep the components of the slurry in suspension until the crystal matrix forms sufficiently to assure uniform distribution. Sand or other aggregates are prevented from settling. The polysaccharide also acts as a viscosity modifier that keeps the viscosity uniform until the slurry sets. Lower viscosity provided a slurry that could be pumped at lower pressure and at higher volumes, producing a dried product stronger than prior compositions. At the same time, plasticity of the mixture is improved, allowing it to flow under a sheer stress and resist flow when the shear stress is removed. When sprayed, the product builds up faster on the pattern and is stronger after setting. Other properties that are altered by the addition of polysaccharides include improved suspension of particulates, reduced bleeding, better workability, easier application and improved pumpability.

The polysaccharides that are particularly preferred for use with this invention are varied. Biopolymeric gums are most preferred. Glucan products, such as scleroglucan, schizophyllan and the like are especially preferred. Scleroglucan is produced by filamentous fungi of the genera *Sclerotium*. Schizophyllan is an extracellular polysaccharide produced by fungi of the genera *Schnizophyllum*. Scleroglucan and schizophyllan are polysaccharides whose linear chain of 1–3 linked D-glycosyl units with about 30 to about 35 percent of the linear chain containing single D-glycosyl units that are attached by 1–6 linkages. The average molecular weight is greater than or equal to $5 \times 10^6$. They are nonionic homopolysacchrides. The chains are self-associated in a triple helix arrangement. They dissolve in water to form pseudo plastic solutions. Additional characterization of these compounds and a method for making them is taught in U.S. Pat. No. 4,954,440, herein incorporated by reference. A preferred scleroglucan is marketed by SKW Chemical, Inc (Marietta, Ga.) under the trade name BIOVIS. Other polysaccharide gums, such as xanthan gums, welan gums and other gums are can also be used with this invention.

Heteropolysaccharides are high molecular weight, generally linear carbohydrate polymers containing two or more different kinds of monosaccharides. The two or more kinds of monosaccharides that form a repeating unit that is polymerized, such as S-657, discussed in U.S. Pat. Nos. 5,175, 278 and 6,110,271 herein incorporated by reference. This polysaccharide is an example of a xanthan gum that is particularly useful in this invention. A preferred polysaccharide, S-657, forms an extended intertwined 3-fold left-handed double helix with a molecular weight estimated in excess of two million Daltons and is marketed under the trade name Diutan by Kelco Biopolymers (San Diego, Calif.).

Polysaccharides are useful in amounts from about 0.001% to about 10% by weight of the dry components. Preferred ranges include from 0.01% to about 2%, from about 0.05% to about 1% and from about 0.05% to about 5% on a dry weight basis. In embodiments that include an internal binder, discussed in detail below, polysaccharide concentrations of from 0.001% to 5% by weight are useful. Preferred ranges of polysaccharide concentration are from 0.01% to about 2%, from 0.02% to 1% and from 0.01% to about 0.6% for these embodiments. Where no optional internal binder is used, higher concentrations of polysaccharide, from about 0.001% to about 10% are used. Preferred polysaccharide concentrations for embodiments having no internal binder include about 0.05% to about 2%, from 0.1% to about 1% and from about 0.07% to about 0.9%.

The dry mixture optionally includes an internal lubricating dispersible binder that disperses when the dry plaster mixture is mixed with water to form a slurry, is deposited throughout the calcium sulfate dihydrate crystalline structure after set, and allows the hardened composition to hold a sharp corner when machined. The internal binder disperses in the slurry and later is deposited throughout the calcium sulfate dihydrate crystalline structure after set. Deposit of the internal binder throughout the interlocking calcium sulfate dihydrate crystals inhibits crack propagation within the crystalline structure. This allows the hardened composition to be dimensionally stable from room temperature to 250° F. (121° C.), and to hold a sharp corner and a smooth contour when machined. Further, the internal binder promotes the production of generally evenly sized shavings during machining and, results in a corresponding drastic reduction of dust.

In preferred embodiments, it is contemplated that the internal binder is a free flowing, water redispersable polymer powder having a glass transition temperature, $T_g$, sufficient to permit the polymer to be rigid at room temperature. In some preferred embodiments, the polymer is water soluble, and the degree of water solubility is inversely proportional to the molecular weight of the binder.

Preferably, the internal binder is a high molecular weight amorphous polyethylene glycol powder. Poly(ethylene glycol) is commercially available and also may be prepared by many known and conventional polymerization techniques. In the preferred embodiment, a poly(ethylene glycol) powder having an average molecular weight of 8,000 Daltons is used to provide uniform distribution of the polymer in the slurry. A non-powder form of poly(ethylene glycol) is also contemplated.

The addition of the free flowing, water redispersable polymer results in suitable machinability of the composition upon set. It has been found that this polymer slightly increases the plasticity of the slurry because of a hygroscopic effect. If the water to plaster ratio is fixed the hygroscopic effect will result in a slight thickening effect. The slight thickening effect enhances the ability of the formulation to be spray applied especially on vertical surfaces. In addition, poly(ethylene glycol) demonstrates inherent lubricating qualities. This quality results in the minimization of friction during machining and therefore the prevention of agglomorization of the internal binder while machining.

The dry mixture includes up to 13%, preferably 1–13% more preferably 4 to 12% or 3 to 7%, even more preferably approximately in the range of 3 to 6%, by weight poly (ethylene glycol) powder. It is contemplated that, in the preferred ranges above, a lower concentration of the internal binder yields increased strength of the composition, but also increases wear on the machining equipment. At higher concentrations of this internal binder, the strength is lower but less wear on the machining equipment results. Therefore, in the preferred range of 6–8%, 6% will provide relatively greater strength, while 8% will provide relatively greater lubricity. Poly(ethylene glycol) powder is available under the trade name CARBOWAX (Union Carbide Corp., Danbury, Conn.).

Vinyl acetate based redispersable powder polymer derivatives, such as ethylene/vinyl acetate/vinyl chloride and ethylene/vinyl acetate/vinyl versatate terpolymers, may also be used as the internal binder. In addition, vinyl/acrylic copolymers, ethylene/vinyl acetate/vinyl versatate acrylate terpolymers, styrene acrylic copolymers, and vinyl acetate-vinyl versatate copolymers may be used as the internal binder.

However, as discussed above, all or a portion of the internal binder is replaceable by increasing the proportion of polysaccharide. It is anticipated that these two components form a sliding scale whereby the concentration of internal binder can be decreased when the concentration of polysaccharide is increased. The reverse is also true, however, care must be taken when the concentration of some internal binders, such as PEG, are increased. In high concentrations, PEG produces a waxy surface that promotes adhesion of the machined shavings to the surface being machined, to the cutting tool and to each other. This can lead to clumps of sticky shavings that must be removed frequently and are hard to clean up. Preferably, PEG concentrations are maintained in a range where shavings fall cleanly away from the cutting surface during machining.

A highly branched, water redispersable, free flowing polymer, namely, methoxy polyethylene glycol, could also be used as an internal binder in place of the poly(ethylene glycol). In the present composition, a preferred molecular weight of the methoxy polyethylene glycol is between 2,000 and 5,000 Daltons.

The amount of water added to the dry mixture ranges from 10% of the weight of the dry mixture to about 50% by weight. Preferably, the water content ranges from about 20% to about 40%, and more preferably from about 28% to about 32%. The selection of a suitable amount of water to be added is within the skill of an artisan. A fast-drying, sprayable plaster preferably includes water in the range of about 15% to about 25% by weight of the dry mixture.

Water used to make the slurry should be as pure as practical for best control of the properties of both the slurry and the set plaster. Salts and organic compounds are well known to modify the set time of the slurry, varying widely between accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

In another embodiment of the invention, the preferable water content ranges from about 15% to about 25%. Improvement in the flowability of the slurry allows formation of a pumpable slurry at lower water level. In any plaster composition, increased water addition decreases the strength of the set plaster. If a sprayable plaster requires strength, water addition can be reduced to make a stronger product. Fast drying formulas are also obtainable by reducing the water content as there is less water to be removed by drying.

Sprayable plasters require closer control of the set time than other plaster compositions. Once water is added to make the slurry, crystals of calcium sulfate dihydrate start to form. By the time the slurry passes through the spray apparatus, the crystals should remain sufficiently small to pass through the apparatus without clogging it. Upon exiting the spray apparatus, the slurry should be thick enough to stick to the substrate or to previous layers of plaster without running. Setting rates are often retarded to provide longer working times then accelerated for faster set and finishing.

Preferred additives in the dry mixture for accelerating setting rate include acids and sulfates, such as aluminum sulfate, used in amounts up to 10 wt % on a dry, aggregate-free basis. The concentration of accelerators in the present invention is reduced over that of prior art and is preferably less than 1% by weight.

Calcium sulfate dihydrate that has been finely ground is also a preferred accelerator. When freshly prepared, it has high potency. However, when stored prior to use, it loses its effectiveness. U.S. Pat. No. 2,078,198, herein incorporated by reference, discloses improved accelerators comprising calcium sulfate dihydrate intermixed with sugar. This mixture renders the calcium sulfate dihydrate less subject to deterioration by aging. Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. Ground calcium sulfate dihydrate prepared in this manner is referenced in the examples as "CSA" (United States Gypsum Co., Chicago, Ill.).

Addition of potassium sulfate to the mixture should be minimized, as it has been found that the presence of potassium sulfate in the set machinable thickness diminishes its strength. Other accelerators, such as aluminum sulfate, are commercially available and are well known to those skilled in the art of formulating machinable, plaster-based compositions.

An inert filler may be included in any of the embodiments to improve the machinability and to decrease the density of the machinable thickness. The preferred filler is a surface coated, low density fine perlite, such as Noble Perlite 200C (Akzo Nobel, the Netherlands) comprising up to 1 percent by weight of the dry plaster-based mixture. Other known inert fillers include calcium carbonate, graphite, resin microspheres and the like.

A defoamer may also be added to the dry mixture. Defoamers are well known in the art and are used to decrease air entrainment in the slurry, therefore reducing air pockets in the composition after it is sprayed. A defoamer comprising approximately 0.1% to 1%, more preferably 0.2% to 0.8%, by weight of the dry mixture, produces the desired results. In the present invention, the preferred defoamer is FOAMASTER CN defoamer and is available from Geo Specialty Chemicals of Ambler, Pa. Numerous other defoamers are commercially available and one skilled in the art could readily find a suitable substitute for the preferred defoamer.

Calcined gypsum compositions of this invention optionally have a number of further additives depending on the specific application. These additives can include thickeners, polymeric resins, preservatives, and other additives. Additives for a particular purpose, as well as the appropriate concentrations, are known to those skilled in the art. Coloring agents, such as pigments, dyes or stains are also useful as additives, particularly in flooring applications. Any known coloring agents can be used with this invention. Titanium dioxide is particularly useful to whiten the composition. The coloring agents are used in amounts and added by methods conventionally used for compositions of this type. Preferred thickeners include cellulosic thickeners, such as Methocel (Dow Chemical, Midland, Mich.). Polymeric resins, such as Elotex 50E200 (National Starch & Chemical, Bridgewater, N.J.), are optionally added to modify the surface properties of the slurry. Other additives are known to modify properties of the calcium sulfate hemihydrate slurry or the resulting set plaster. It will be apparent to an artisan that other additives are known to modify particular properties of the slurry or the set gypsum product. It is contemplated that any of them would be useful with embodiments of this invention for the purposes for which they are known.

Any of the embodiments of this invention may also be stored in a ready mixed state or in slurry form using a chelating agent to prevent the calcium sulfate hemihydrate from hydrating to form calcium sulfate dihydrate. A chelating agent, such as tetrasodium pyrophosphate, could be added to the dry mixture. When the user combines the mixture with water, the presence of the chelating agent prevents the slurry from setting. To permit set, an accelerating agent is then mixed with the slurry to reverse the chelation effect. Accelerating agents, such as sulfates, for example aluminum sulfate, are well known to those skilled in the art of formulating machinable plaster compositions.

The sprayable plasters made in accordance with this invention can be applied to a substrate using any appropriate spray apparatus known in the art. They are advantageously applied using a spray gun such as that disclosed in U.S. Pat. No. 6,273,345, herein incorporated by reference. This spray gun pumps the plaster slurry through the gun. As the plaster slurry leaves the gun, the droplets are propelled through an atomized mist of a liquid set accelerator. The accelerator coats the droplets of plaster, increasing the setting rate of the plaster and causing it to set rapidly as it builds up on the model surface. Preferably the liquid accelerator is an aqueous solution of salts and other compounds known to hasten the set time of a calcium sulfate hemihydrate slurry. A preferred accelerator of an aqueous solution including calcium sulfate dihydrate, zinc sulfate and aluminum sulfate is disclosed in U.S. Pat. No. 6,379,458 to Immordino, herein incorporated by reference.

These and other embodiments are demonstrated in the following Examples. In the examples, unless otherwise noted, all amounts listed are in pounds. Concentrations or percentages are calculated on a dry, aggregate-free weight basis.

In the examples that follow, references to set time refer to Vicat set time per ASTM C-472, herein incorporated by reference. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300 gram Vicat needle was held half way between the center and the outer edge of the patty, perpendicular to the patty surface. The needle was held to the patty surface and released to fall freely of it's own weight. Set time was determined when the needle failed to penetrate to the bottom of the patty. If the degree of penetration was unclear, the needle was given a little push to determine if it had touched the underlying surface.

EXAMPLE 1

An improved sprayable, machinable plaster formulation was developed using a polysaccharide dispersant. The composition of a comparative formulation, #1 Formula and a formulation of the present composition, #3 Formula, were compared. The formulations are shown in Table I below:

TABLE I

Sprayable Plaster Formulations

| Component | #1 Formula | | #3 Formula | |
|---|---|---|---|---|
| Alpha-calcined gypsum | 92.6 lbs. | (42.04 Kg) | 93.1 lbs. | (42.49 Kg) |
| PEG 8000 | 4.5 lbs. | (2.04 Kg) | 4.5 lbs. | (2.04 Kg) |
| RP-226 | 1.5 lbs. | (680 g) | 1.5 lbs. | (680 g) |
| Filler | 0.563 lb. | (255 g) | 0.625 lb. | (283 g) |
| Thickener | 0.188 lb. | (85 g) | 0.0 | |
| Accelerator | 0.375 lb. | (170 g) | 0.0 | |
| Ivory Lime Finish | 0.113 lb. | (51 g) | 0.0 | |
| Defoamer | 0.125 lb. | (57 g) | 0.05 lb. | (23 g) |
| Retarder | 0.063 lb. | (29 g) | 0.009 lb. | (4 g) |
| CSA | 0.038 lb. | (17 g) | 0.0 | |
| Amical 48 | 0.009 lb. | (4 g) | 0.0 | |
| Polysacchride | 0.0 | | 0.175 lbs. | (80 g) |

Both plasters were prepared by assembling the ingredients and weighing them. The dry ingredients were mixed together. Water was measured into a cup. The dry ingredients were mixed into the water and blended until a homogenous mixture was obtained. Formula #1 (Comparative) was very viscous and had to have help to flow out of the cup. The #3 Formula with reduced viscosity flowed out of the cup by itself.

When polysaccharide was added, two set accelerators were eliminated and the amount of retarder was significantly reduced. This led to a slurry that was less sensitive to temperature, had a lower viscosity and was easily sprayed.

EXAMPLE 2

The two samples were both tested by a Brookfield Viscosity Test. Viscosity of each sample was tested each minute until it solidified. Results of the viscosity testing (in centipoises) are summarized below:

TABLE II

Viscosity Testing of Sprayable Plasters

| Time, Minutes | #1 Formula | #3 Formula |
|---|---|---|
| 2 | 32280 | 13800 |
| 3 | 32560 | 13180 |
| 4 | 32880 | 12846 |
| 5 | 32960 | 12560 |
| 10 | 33080 | 11760 |
| 15 | 33000 | 10920 |
| 20 | 32840 | 10600 |
| 25 | 32640 | 10000 |
| 30 | 32240 | 9320 |
| 35 | 32360 | 8280 |
| 40 | 33360 | 7880 |
| 45 | 34960 | 10520 |
| 50 | 36300 | 19800 |
| 51 | 36440 | 23400 |
| 52 | 36640 | 27400 |
| 53 | 37080 | Set |
| 54 | 37760 | |
| 55 | 37960 | |
| 56 | 38520 | |
| 57 | 38800 | |
| 58 | 39620 | |
| 59 | 39960 | |
| 60 | Set | |

1 Formula (Comparative) of the sprayable, machinable plaster was more viscous throughout the test period. #3

Formula required less energy to spray than #1 Formula. When sprayed on a vertical surface using the spray apparatus described in U.S. Pat. No. 6,273,345, #3 Formula was observed to adhere better to the substrate and build up more quickly without distortion.

EXAMPLE 3

A formulation for a sprayable, machinable plaster was developed that did not require an internal binder. The plaster was made according to the composition of Table III.

TABLE III

| No Internal Binder Formula | |
| --- | --- |
| Alpha-hemihydrate | 93.7% |
| RP-226 | 4.5% |
| Noble Perlite 200C | 0.8% |
| Foamaster CN2 | 0.5% |
| Biovis | 0.5% |

Plaster made according to this example was mixed as in Example 1 and sprayed as in Example 2. The spray characteristics were observed to be comparable to #3 Formula of Example 2.

Compared to the #3 Formula, the No Internal Binder Formula had comparable spraying characteristics. During machining, less of the cuttings clung to the machined surface in the No Binder Formula than in the #3 Formula. #3 Formula had a waxy surface to which the cuttings adhered. It was necessary to stop periodically to wipe the surface clean of cuttings so that the surface was visible.

EXAMPLE 4

A plaster suitable for architectural ornamentation was made by the addition of a polysaccharide. Samples of the present composition, HP FGR, and a comparative material, FGR, were prepared as follows:

TABLE IV

| Base Plaster Composition for Architectural Ornamentation | | |
| --- | --- | --- |
| Component | HP FGR | FGR |
| α-Calcined Gypsum | 3875 lb. (1759 Kg) | 4000 lb. (1816 Kg) |
| 50E200 Resin | 30 lb. (13.6 Kg) | 0 |
| Accelerator | 10 lb. (4.5 Kg) | 0 |
| Defoamer | 1 lb. (450 g) | 0 |
| Melment F-17G | 40 lb. (18.2 Kg) | 0 |
| Set Accelerator | 1 lb. (450 g) | 1 lb. (450 g) |
| Titanium Dioxide | 40 lb. (18.2 Kg) | 0 |
| Set Retarder | 13.5 lb. (6.1 Kg) | 13.5 lb. (6.1 Kg) |
| Polysaccharide | 1.0 lb. (450 g) | 0 |
| Consistency, cc water/100 g mix | 22 | 30 |

The gypsum cement was prepared by first blending the dry components. Wet components were added to the water in a mixer and combined to make a homogenous solution. The dry components were then sifted into the mixer and mixed until a uniform slurry was obtained. Each of the slurries was poured into a mold to form a cast sheet 0.5 inches thick.

According to the test method D256, test method A, ten specimens were cut from a cast sheet. The specimens each had a width of 0.5 inches, a length of 2.5 inches (6.3 cm) and a thickness of 0.5 inches (1.3 cm). Test results for the formula of this invention, HP FGR, and the Comparative Sample are listed in Table V below:

TABLE V

| Test Results for Spray Plaster for Architectural Ornamentation | | |
| --- | --- | --- |
| Test | HP FGR | FGR |
| Wet Density (Avg. 6 cubes) | 130.6 lb/ft$^3$ (2.09 g/cc) | 123.1 lb/ft$^3$ (1.97 g/cc) |
| Dry Density (Avg. 6 cubes) | 123.7 lb/ft$^3$ (1.98 g/cc) | 112.9 lb/ft$^3$ (1.81 g/cc) |
| Dry Compressive Strength | 13077 psi (919.3 Kg/cm$^2$) | 10293 psi (723.6 Kg.cm$^2$) |
| Barcol Hardness | 65 | 57.1 |
| Monotron Dry Hardness | 144.6 | 106.7 |
| Flexural Strength | 2042 psi (143.5 Kg/cm$^2$) | 1965 psi (138.1 Kg/cm$^2$) |
| Flexural Strength | 9.54 × 10$^5$ | 9.76 × 10$^5$ |

As shown, the density, compressive strength and hardness are all significantly higher in the sample prepared with the polysaccharide dispersant compared to the comparative sample. Preparation of the samples demonstrates that the sprayable plaster of this invention can also be cast successfully. It can also be troweled or finished in any conventional manner.

The embodiments and examples shown herein are intended to exemplify the invention and are not intended to limit it in any way. While particular embodiments of the sprayable and machinable plaster of the present invention have been shown and described, it will be appreciated by those skilled in the art that changes and modifications may be made thereto without departing from the invention in its broader aspects and as set forth in the following claims.

What is claimed is:

1. A mixture to be employed in conjunction with water for preparing a sprayable slurry that hydrates to form a machinable plaster composition, said mixture comprising:
   from about 80% to about 98% by weight calcium sulfate hemihydrate;
   from about 1% to about 5% by weight adhesive binder for adhering said plaster mixture to a substrate;
   from about 0.001% to about 10% of a polysaccharide and an internal binder.

2. The mixture according to claim 1 wherein said internal binder is present in amounts of about 1% to about 13% by weight.

3. The mixture according to claim 2 wherein said internal binder is a poly (ethylene glycol).

4. The mixture according to claim 2 wherein said internal binder is a poly(ethylene glycol) having a molecular weight of approximately 8,000 Daltons.

5. The mixture according to claim 2 wherein said internal binder is a poly (ethylene glycol), and said adhesive binder is an ethylene/vinyl acetate copolymer.

6. The mixture according to claim 1 wherein said adhesive binder is a water redispersible composition having adhesive properties.

7. The mixture according to claim 1 wherein said adhesive binder is an ethylene/vinyl acetate copolymer.

8. The mixture according to claim 1, further comprising a polymeric resin.

9. The mixture according to claim 8 wherein said polysaccharide has a molecular weight greater than 2,000,000 Daltons.

10. The mixture according to claim 1 wherein said mixture comprises approximately 80% to 90% by weight of said calcium sulfate hemihydrate, approximately between 0.01% and 1% by weight of said polysaccharide, approximately between 4% and 12% by weight of said internal binder and approximately between 1 and 5 percent by weight of said adhesive binder.

11. The mixture according to claim 10 wherein said internal binder is poly(ethylene glycol), and said adhesive binder is ethylene/vinyl acetate copolymer.

12. The mixture according to claim 10 further including less than 1% of a defoamer.

13. The mixture according to claim 11 wherein said mixture comprises from about 6% to about 9% by weight of said poly(ethylene glycol).

14. The mixture according to claim 1 wherein said polysaccharide is at least one selected from the group consisting of scleroglucans and xanthan gums.

15. A sprayable slurry that hydrates to form a machinable plaster, said slurry comprising:
    a dry mixture comprising:
    calcium sulfate hemihydrate;
    an internal binder
    an adhesive binder; and
    polysaccharide; and
    from about 10% to about 50% water based on the weight of said dry mixture.

16. The slurry according to claim 15 wherein said slurry comprises less than 32 weight % water based on the weight of the dry mixture.

17. The slurry according to claim 16 wherein said slurry comprises less than 25 weight % water based on the weight of the dry mixture.

18. The slurry according to claim 15 wherein said calcium sulfate hemihydrate is alpha-calcium sulfate hemihydrate.

19. The slurry according to claim 15, further comprising a defoamer.

20. The slurry according to claim 19 wherein said defoamer comprises from about 0.2% to about 0.8% by weight of said mixture.

21. The slurry according to claim 15 further including a setting rate retarder comprising one or more of sodium citrate, citric acid, tartaric acid, sodium tartrate, a proteinaceous material, or a phosphate.

22. The slurry according to claim 15 wherein said polysaccharide is at least one selected from the group consisting of scleroglucans and xanthan gums.

23. A method of making a shaped plaster article comprising:
    mixing a slurry comprising calcium sulfate hemihydrate, an adhesive binder for adhering said slurry to a substrate, 0.01 to 10% by weight polysaccharide and water;
    spraying said slurry onto a substrate;
    allowing said slurry to set forming a hardened plaster; and
    machining the hardened plaster to a shape with machine tools.

24. A shaped gypsum article on a substrate comprising:
    an article shaped by machining a set product of a slurry sprayed onto and adhering to a substrate, said slurry comprising calcium sulfate hemihydrate, an adhesive binder for adhering said plaster mixture to a substrate, 0.001% to 10% by weight polysaccharide and water.

25. The shaped gypsum article according to claim 24 wherein said polysaccharide is at least one selected from the group consisting of scleroglucans and xanthan gums.

* * * * *